US012526073B2

(12) United States Patent
Beidas

(10) Patent No.: US 12,526,073 B2
(45) Date of Patent: Jan. 13, 2026

(54) ITERATIVE MITIGATION OF NONLINEAR CO-CHANNEL INTERFERENCE IN HIGH-EFFICIENCY MULTIBEAM SATELLITE SYSTEMS

(71) Applicant: Hughes Network Systems, LLC, Germantown, MD (US)

(72) Inventor: Bassel F. Beidas, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 564 days.

(21) Appl. No.: 17/937,218

(22) Filed: Sep. 30, 2022

(65) Prior Publication Data

US 2024/0129062 A1  Apr. 18, 2024

(51) Int. Cl.
*H04L 1/00* (2006.01)
*H04B 1/10* (2006.01)
*H04B 7/185* (2006.01)

(52) U.S. Cl.
CPC ......... *H04L 1/0048* (2013.01); *H04B 1/1027* (2013.01); *H04B 7/1851* (2013.01)

(58) Field of Classification Search
CPC ............. H04L 1/0048; H04L 25/03286; H04L 25/067; H04L 27/32; H04L 1/005; H04B 1/1027; H04B 7/1851; H04B 7/2041; H03M 13/3746; H03M 13/6325; H03F 3/189; H03F 1/32; H03F 1/26; H03F 3/20; H03F 2200/451
See application file for complete search history.

(56) References Cited

U.S. PATENT DOCUMENTS 9,071,316 B2 * 6/2015 Rusek .................. H04B 1/1027
11,038,539 B1 * 6/2021 Beidas .................. H04L 1/0048
(Continued)

OTHER PUBLICATIONS

Beidas Bassel F et al: "Superior Iterative Detection for Co-Channel Interference in Multibeam Satellite Systems", IEEE Transactions on Communications, IEEE Service Center, Piscataway, NJ, USA, vol. 68, No. 12, Oct. 9, 2020 (Oct. 9, 2020), pp. 7660-7671, XP011826004, ISSN: 0090-6778, DOI: 10.1109/TCOMM.2020.3029809 [retrieved on Dec. 15, 2020] abstract * section IV * figure 5.

(Continued)

*Primary Examiner* — Lana N Le
(74) *Attorney, Agent, or Firm* — Capitol City TechLaw; Jasbir Singh

(57) ABSTRACT

A communications apparatus to resolve a composite signal including an induced nonlinear distortion, a desired signal and interferer signals, wherein the desired signal includes desired symbols and the interferer signals include interferer symbols using N frameworks, each framework including a detector to partition the desired symbols and the interferer symbols based on an interference severity into a dominant group and a non-dominant group, and to generate A Posteriori Probabilities (APP) of the desired symbols and the interferer symbols, wherein the detector of each of the N frameworks generates the APP based on a feedback of the APP from each of the N frameworks, and the detector reduces the induced nonlinear distortion of the desired signal using a nonlinear mathematical model such as Volterra series.

18 Claims, 5 Drawing Sheets

(56) References Cited

U.S. PATENT DOCUMENTS

| | | | |
|---|---|---|---|
| 2011/0051858 A1* | 3/2011 | Salvekar | H04L 1/005 |
| 2015/0010118 A1* | 1/2015 | Seshadri | H04L 25/032 |
| | | | 375/341 |
| 2015/0156003 A1* | 6/2015 | Khandani | H04L 5/143 |
| 2015/0311973 A1* | 10/2015 | Colavolpe | H04B 7/1851 |
| 2017/0207934 A1* | 7/2017 | Iyer Seshadri | H04L 25/03165 |
| 2021/0159923 A1 | 5/2021 | Beidas et al. | |
| 2024/0214014 A1* | 6/2024 | Masood | H04B 1/10 |
| 2024/0348273 A1* | 10/2024 | Fletcher | H03F 1/32 |

OTHER PUBLICATIONS

International Search Report for PCT Application No. PCT/US2023/075055.

* cited by examiner

ITERATIVE MITIGATION OF NONLINEAR CO-CHANNEL INTERFERENCE IN HIGH-EFFICIENCY MULTIBEAM SATELLITE SYSTEMS

FIELD

A low complexity receiver suitable for user terminals which copes with joint effects of nonlinearities and co-channel interference (CCI) in a multibeam satellite system with Co-Channel Interference (CCI), in particular, systems that employ aggressive frequency reuse. The receiver uses a divide-and-conquer (DAC) strategy to decompose the interfering sources into smaller sets depending on their intensity, and the strategy reduces the induced nonlinear distortion of the desired signal using a nonlinear mathematical model such as a Volterra series. The DAC strategy is utilized in a successive interference cancellation (SIC) structure to maximize the achievable sum rate. Additionally, the proposed iterative DAC (IDAC) receiver is a joint detector that exchanges soft-in soft-out (SISO) information with single-user FEC decoders.

BACKGROUND

Aggressive frequency reuse in multibeam satellite systems with their hundreds of narrow spot beams can alleviate spectrum scarcity as well as provide service flexibility and ubiquitous connectivity. However, this creates a harsh environment of co-channel interference (CCI) through the sidelobes of the spot-beams' radiation patterns. This problem is compounded by pushing satellite transponders close to saturation to achieve high power efficiency.

Prior art on multibeam satellite systems assume that CCI is received with only linear distortions. This is a valid assumption only when the transponder high-power amplifier (HPA) is inefficiently operated in its linear dynamic range. However, it is desirable to increase the power efficiency by operating HPAs close to saturation inducing nonlinear contribution. The performance of highly power efficient and highly spectral efficient multibeam satellite systems is severely degraded without accounting for nonlinear distortions.

FIG. 1 illustrates a prior art beam laydown pattern with a 4-reuse plan for a multi-beam satellite, according to various embodiments.

FIG. 1 illustrates a reuse plan combining signal polarization and non-overlapping frequency spectrums to create a 4-reuse plan 100. In the example, the four colors (hashing in FIG. 1) correspond to four different frequency/polarization allocations. An available frequency spectrum is divided into two frequency sub-bands—F1 and F2—and each sub-band is assigned/mapped to a different color, and two orthogonal polarizations are assigned/mapped colors to provide the two other colors in the 4-color reuse plan. A service or coverage area 114 may be divided into cells. Multi-beam satellites typically illuminate multiple hexagonal cells within a service area 114. In exemplary embodiments, a cell 102 may be illuminated by a far field beam pattern in band F1 using a right hand circular polarization (RHCP), a cell 104 in band F1 may be illuminated by a far field beam pattern in band F1 using a left hand circular polarization (LHCP), a cell 106 may be illuminated by a far field beam pattern in F2 using a RHCP and a cell 108 which may be illuminated by a far field beam pattern in F2 using a LHCP. A multi-beam satellite implementing a reuse plan may arrange the two polarizations in separate alternate rows, for example, a LHCP row 110 and a RHCP row 112. It is possible to tessellate a desired coverage area, such as, earth's surface, using an Nc color reuse tessellate where Nc is any positive natural number. To provide a very high capacity for broadband satellites more aggressive reuse factors such as reuse 1 and reuse 2 may be used.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

The present teachings significantly improve spectral efficiency and power efficiency in a multibeam satellite systems employing aggressive frequency reuse and where the transponders operate close to saturation. A receiver of the present teachings successfully mitigates nonlinear CCI at the user terminal. The receiver compensates for nonlinear memory effects that may be compounding the CCI maybe unavoidable in a multibeam satellite system. Significant gains are demonstrated when compared with systems that do not use the present teachings.

In some aspects, the techniques described herein relate to a communications apparatus including: a composite signal including an induced nonlinear distortion, a desired signal and interferer signals, wherein the desired signal includes desired symbols and the interferer signals include interferer symbols; and N frameworks, each framework including a detector to partition the desired symbols and the interferer symbols based on an interference severity into a dominant group and a non-dominant group, and to generate A Posteriori Probabilities (APP) of the desired symbols and the interferer symbols, wherein the detector of each of the N frameworks generates the APP based on a feedback of the APP from each of the N frameworks, and the detector reduces the induced nonlinear distortion of the desired signal using a nonlinear mathematical model.

In some aspects, the techniques described herein relate to a communications apparatus, wherein the detector of each of the N frameworks transforms the APP to a first Log-Likelihood Ratios (LLRs) using a bit-to-symbol mapping rule, and each of the N frameworks further includes a deinterleaver to deinterleave the first LLRs into a decoder input, a Forward Error Correcting (FEC) Decoder to decode the decoder input and to generate a second LLRs from a decoded decoder input, and an interleaver to interleave the second LLRs, wherein the second LLRs are fed back as the APP for a respective N framework after the interleaver of the respective N framework, and the second LLRs of each of the N frameworks represent either the desired symbols or the interferer symbols.

In some aspects, the techniques described herein relate to a communications apparatus, wherein the desired signal is more robust than each of the interferer signals, and the second LLRs from the FEC decoder of a first framework of the N frameworks represent the desired symbols.

In some aspects, the techniques described herein relate to a communications apparatus, wherein at least one of the interferer signals is more robust than the desired signal, and the second LLRs from the FEC decoder of a framework other than a first framework of the N frameworks represent the desired symbols.

In some aspects, the techniques described herein relate to a communications apparatus, wherein the desired symbols are recovered by Simultaneous Decoding (SD) or by Simultaneous Non-unique Decoding (SND).

In some aspects, the techniques described herein relate to a communications apparatus, wherein the induced nonlinear distortion is generated by a High-Power Amplifier (HPA) operating close to its saturation.

In some aspects, the techniques described herein relate to a communications apparatus, wherein the nonlinear mathematical model includes a Volterra series represented as $$s_{NL,n}(t) = \sum_{l} \tilde{\lambda}_{n,l} \cdot \left(s_n(t) \cdot |s_n(t)|^{l-1}\right),$$

where $\tilde{\lambda}_{n,m}$ are complex-valued coefficients to account for the induced nonlinear distortion of a respective HPA of N HPAs.

In some aspects, the techniques described herein relate to a communications apparatus, wherein the communications apparatus is disposed in a SISO Iterative Divide and Conquer (IDAC) receiver and the detector is a SISO DAC detector.

In some aspects, the techniques described herein relate to a communications apparatus, wherein the dominant group includes an Optimal-Bayesian (OB) group via a probability mass function (pmf).

In some aspects, the techniques described herein relate to a communications apparatus, wherein the non-dominant group includes a Noise-Floor (NF) group incorporated via a power of each member and a Subtractive-Cancellation (SC) group incorporated via first- and second-order moments derived from the APP, and the dominant group includes an Optimal-Bayesian (OB) group incorporated via a probability mass function (pmf).

In some aspects, the techniques described herein relate to a communications apparatus, wherein a count of the N frameworks is selected from one (1), two (2) or three (3).

In some aspects, the techniques described herein relate to a communications apparatus, wherein the desired signal and the interferer signals include DVB-S2X standard compliant signals.

In some aspects, the techniques described herein relate to a communications apparatus, wherein a computational complexity of the detector is lowered by focusing on an instantaneous version of a current time sample.

In some aspects, the techniques described herein relate to a computer implemented method including: providing a composite signal including an induced nonlinear distortion, a desired signal and interferer signals, wherein the desired signal includes desired symbols and the interferer signals include interferer symbols; and iteratively computing, N frameworks, each of the N frameworks including partitioning, with a detector, the desired symbols and the interferer symbols based on an interference severity into a dominant group and a non-dominant group, and generating A Posteriori Probabilities (APP) of the desired symbols and the interferer symbols, wherein the detector of each of the N frameworks generates the APP based on a feedback of the APP from each of the N frameworks, and the detector reduces the induced nonlinear distortion of the desired signal using a nonlinear mathematical model.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

Figure 1:
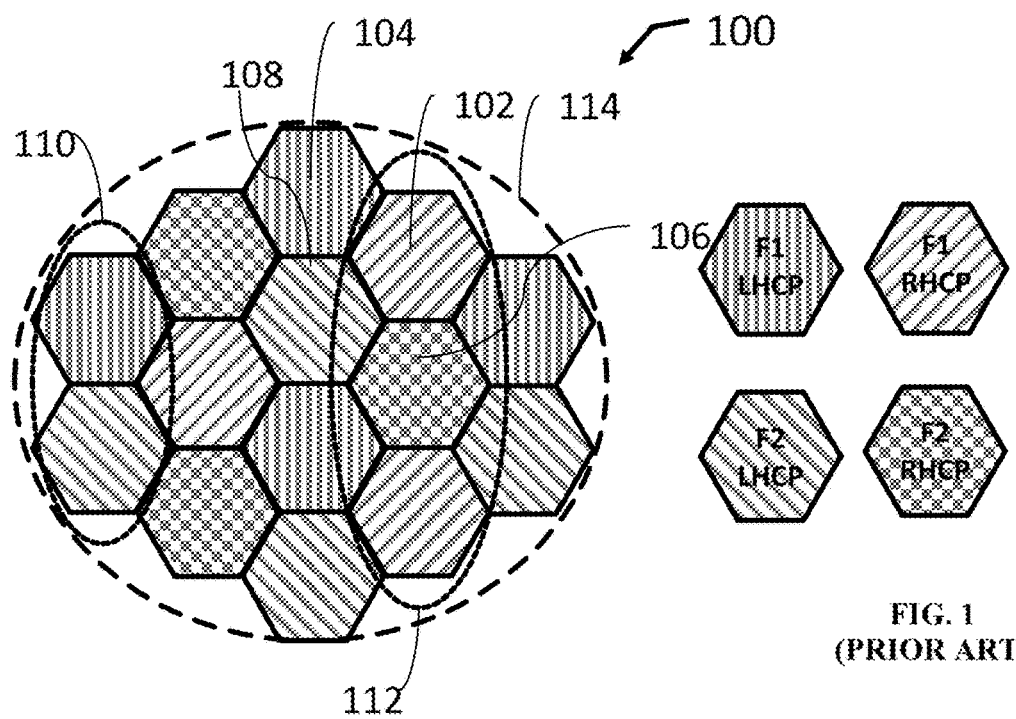
FIG. 1 illustrates a prior art beam laydown pattern with a 4-reuse plan for a multi-beam satellite, according to various embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The present teachings may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

A low complexity receiver suitable for user terminals which copes with joint effects of nonlinearities and co-channel interference (CCI). The receiver uses a divide-and-conquer (DAC) strategy to decompose the interfering sources into smaller sets depending on their intensity. A set is created from the weak interfering sources which are not decoded but considered as thermal noise. The interfering symbols which are decoded are further split into a set that subtracts the strong ones and another set that addresses the intense interferers in an optimal-Bayesian fashion. A predominant feature of the present teachings is the use of Volterra series expansion for accurately modeling the impact of the nonlinear CCI distortion.

The DAC strategy is utilized in a successive interference cancellation (SIC) structure to maximize the achievable sum-rate. Additionally, the proposed iterative DAC (IDAC)

receiver is a joint detector that exchanges soft-in soft-out (SISO) information with single-user FEC decoders.

System Model

The present teachings may be used for a receiver on the forward link (i.e., from the gateways to the user terminals) or a return link (i.e., from the user terminals to the gateways). The receiver is connected to high-directivity transmit antennas, due to which a user terminal experiences a strong line-of-sight with the satellite, contributing to negligible multipath fading. Multibeam satellite systems partition the total system bandwidth into equal, distinct sections, also known as frequency colors, and allocate a single color to every beam. In the most efficient case, the entire available bandwidth can be allocated to every beam and two deployment scenarios are envisioned. The first deployment scenario is a two-color reuse where antenna polarization provides isolation between rows of co-channel beams. A user terminal at the edge of the service area will experience very strong CCI due to a single nearest co-channel neighbor and weaker CCI due to one or more distant co-channel neighbors. The second deployment scenario is a one-color reuse in which both polarizations are employed to serve every beam. In this case, a user terminal at the edge of a service area experiences very strong CCI due to two nearest co-channel neighbors and weaker CCI due to one or more distant co-channel beams. In both scenarios, the CCI from the nearest co-channel beams can be as strong as the desired signal when the user terminal is located at the beam edge, whereas the CCI level due to distant beams will be markedly lower. A predominant feature of this invention is that CCI exhibits strong nonlinear contributions due to operating the satellite transponders close to saturation for high power efficiency.

Figure 2:
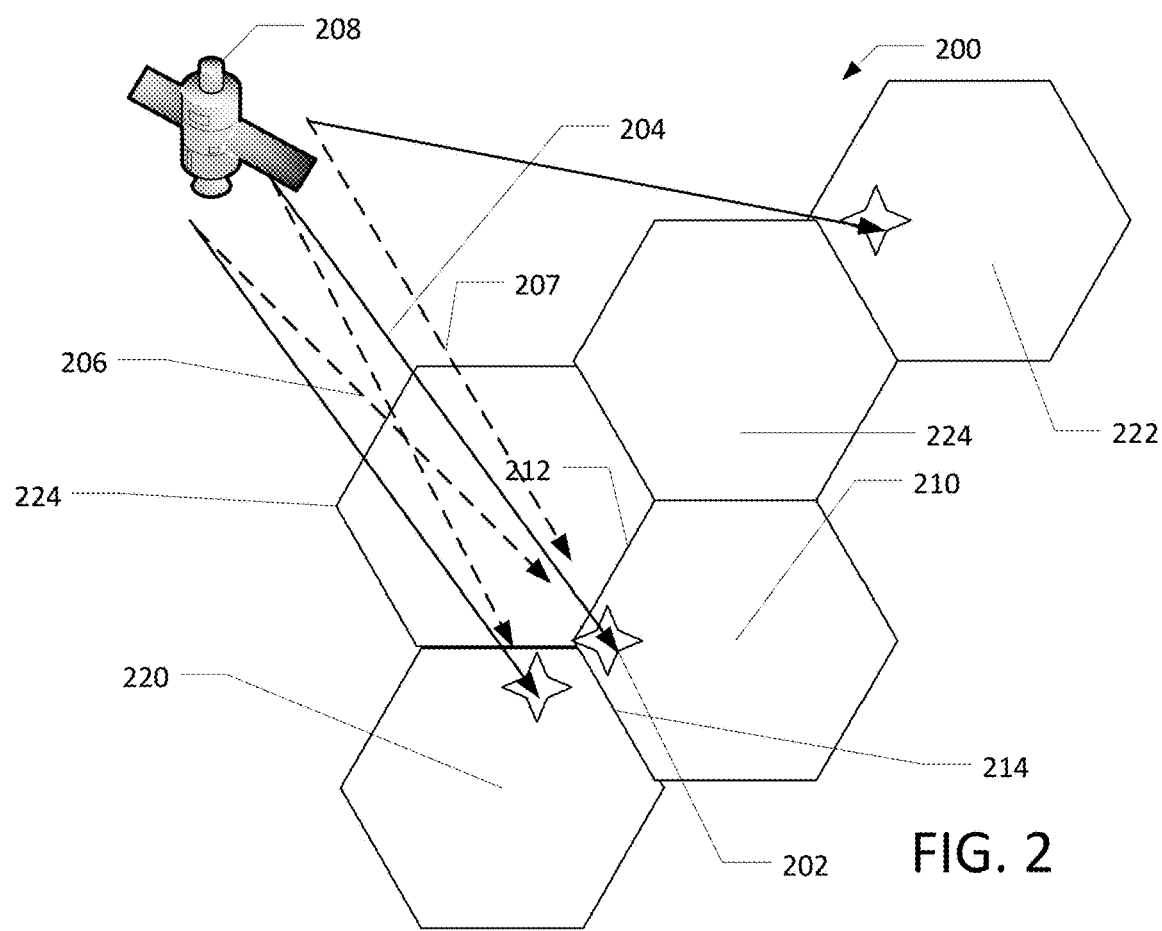
FIG. 2 illustrates two users serviced by two co-channel beams showing CCI between beams according to various embodiments.

FIG. 2 illustrates two users serviced by two co-channel beams showing CCI between beams according to various embodiments.

FIG. 2 illustrates a satellite communications system 200 including a user terminal (UT) 202 communicating with a satellite 208 via a beam 204 (desired signal). When the UT 202 is located near an edge 212 or 214 of their cell 210, a co-channel beam 206 (here intended for cell 220; interferer signal), in a reuse 1 or reuse 2 deployment will interfere with the beam 204. In this case, the UT 202 will receive its desired/intended signal (beam 204) in the presence of interference arising from co-channel beams 206, 207 intended for a UT disposed in the cells 220, 222 respectively. The ratio of the beam 204 at UT 202 (C) to the co-channel beams 206, 207 (I) is known as the carrier-to-interference ratio (C/I) and can be as high as 0 dB, or of equal strength. In some deployments, one or more of the co-channel beams 206, 207 may be more robust than the beam 204. An interference severity may be based on the C/I ratio.

The desired signal and the interferer signals can come from different gateways (not shown), employ different coded-modulation (MODCOD) formats, have different symbol rates and pulse shaping filters with different roll-off factors. The desired and interfering signals can arrive at the user terminal in an asynchronous manner. Even though the co-channel beams may be formed and emitted by the satellite simultaneously, they propagate through different paths causing unavoidable differential delays. Further, the beams could be conveying signals originating from multiple gateways, interconnected via terrestrial links. Other sources that generate memory effects include different symbol rates required by co-channel beams and/or using pulse shaping with different rolloff values. CCI mitigation techniques are required to maintain reasonable performance for such users.

Here co-channel beam 206 may also be known as a dominant source. When a UT, such as UT 202, is disposed near two edges of its cell (i.e., cell 210), the UT 202 may receive two co-channel beams (second co-channel beam not shown but possibly disposed in cell 224) and portions of both may qualify as dominant sources with respect to the desired signal. For example, a current sample of the co-channel beam may be considered a dominant source, while a previous sample of the co-channel beam may be considered a non-dominant source. In some embodiments, an intended signal of a UT may be interfered with by one or more dominant sources.

The co-channel beams 206, 207 may include interfering symbols. Interfering symbols of the co-channel beam 206 targeting the cell 220 immediately adjacent to the cell 210 where the UT 202 is disposed may be partitioned into a dominant group of interfering symbols. Interfering symbols of the co-channel beam 207 targeting the cell 222 not immediately adjacent to the cell 210 may be partitioned into a non-dominant group of interfering symbols. Interfering symbols of a beam (not shown) targeting the cell 224 that is immediately adjacent to the cell 210 may also be partitioned into the non-dominant group of interfering symbols as the UT 202 is not disposed adjacent to a common edge of the cell 210 and cell 225.

Figure 3:
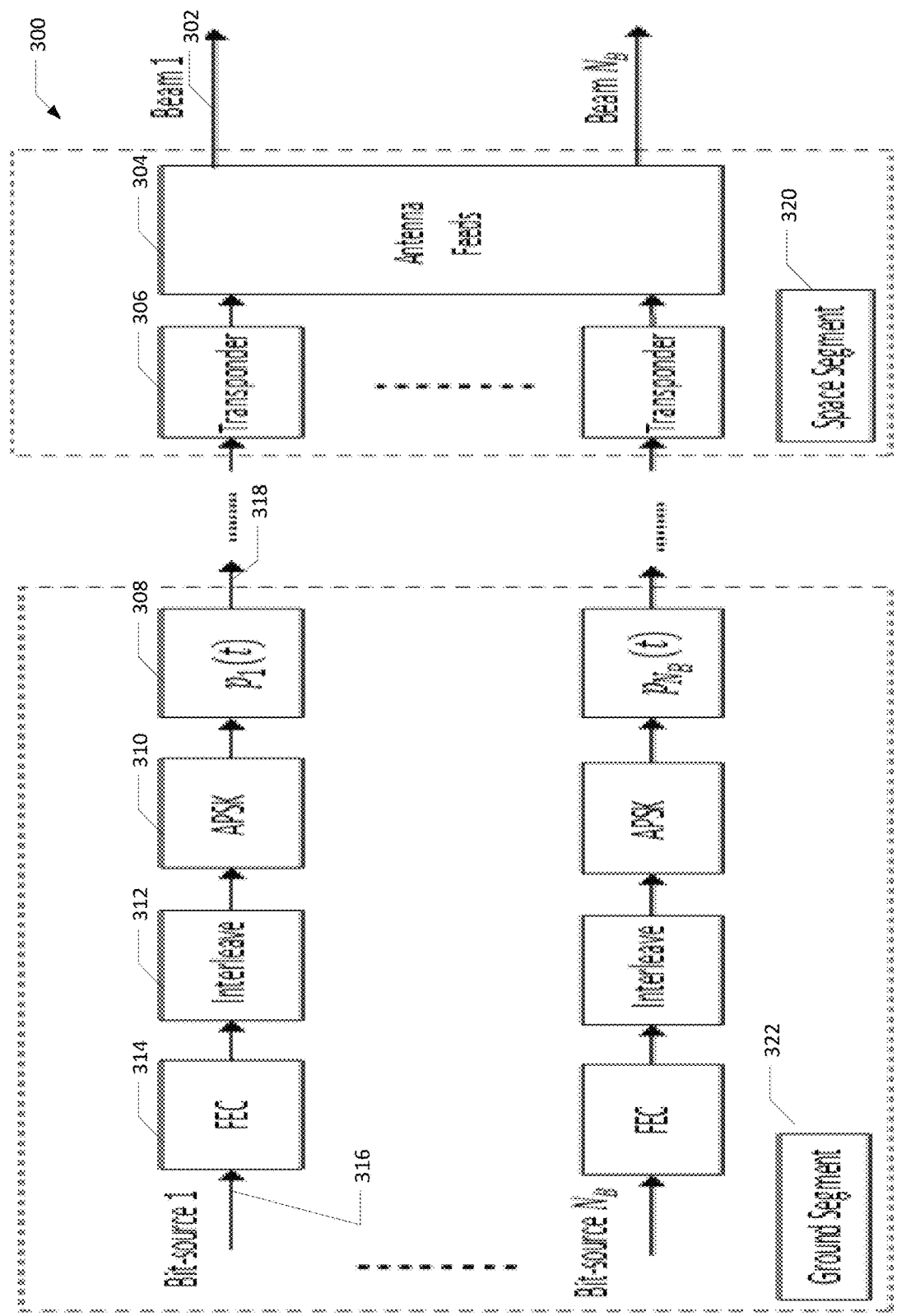
FIG. 3 illustrates a multi-spot beam satellite system model according to various embodiments.

FIG. 3 illustrates a multi-spot beam satellite system model according to various embodiments.

A multi-spot beam satellite system 300 is illustrated in FIG. 3. FIG. 3 focuses on a forward link from a satellite gateway to a user terminal via antenna feeds 304 generating beams 302. For a given beam n, n=1, 2, . . . , $N_{beam}$, information bits 316 intended for a particular user located in a specific beam n, are FEC-encoded 314, bit-interleaved 312 and mapped onto a zero-mean complex constellation 310, with cardinality $M_n$ and normalized to have unit average power 308, at a gateway 322 to form a symbol sequence of length $N_s$ and symbol rate $T_{s,n}^{-1}$ such that, $\{a_{n,i}; i=0, 1, \ldots, N_s-1\}$. The uplink signal after pulse shaping has a baseband representation given by $$s_n(t) = \sum_{i=0}^{N_s-1} a_{n,i} \cdot p_n(t - iT_{s,n}). \quad (1)$$

Uplink signals 318 intended for the different spot beams are processed by their respective non-linear transponders 306 and transmitted to intended beams 302 by the satellite antenna feed 304 after traversing a space segment 320. The non-linear transponders 306 include high-power amplifiers (HPAs) operating close to their saturation to achieve high power efficiency. The induced nonlinear distortion can be accurately modeled using a Volterra series as illustrated in Eq. (2), where $\tilde{\lambda}_{n,l}$ are complex-valued coefficients to account for the amplitude/phase distortions induced by the nonlinear operation of the nth HPA.

$$s_{NL,n}(t) = \sum_l \tilde{\lambda}_{n,l} \cdot \left(s_n(t) \cdot |s_n(t)|^{l-1}\right) \quad (2)$$

When aggressive frequency reuse factors are employed to boost system capacity, especially those at or near the beam/cell edge, user terminals experience high levels of CCI due to the sharing of common time-frequency resources. In such cases, the terminal receives its intended transmission along with transmissions from Co-Channel Interfering (CCI) beams such that the received signal at a single-antenna user terminal can be expressed using Eq. (1) as:

$$r(t) = \sum_{n=1}^{N_{beam}} \gamma_n \cdot s_{NL,n}(t - \epsilon_n T_{s,n}) \cdot e^{j(2\pi\delta_{f_n} t + \theta_n)} + \tilde{\omega}(t), \quad (3)$$

where $y_n$ is a constant complex-valued channel attenuation that models the antenna gain from the nth-beam's feed in the direction of the user terminal under consideration. Here, $\{\epsilon_n, \delta_{f_n}, \theta_n\}$ represent the normalized differences in arrival times, carrier frequencies and carrier phases among the $N_{beam}$ co-frequency beams at the receiver. The set of symbol rates $\{T_{s,n}\}$ are allowed to be different across the received waveforms serviced by the co-channel beams. The downlink noise $\tilde{w}(t)$ may be assumed to be a complex-valued additive white Gaussian noise (AWGN) with single-sided power spectral density (PSD) level of $N_0$ (Watt/Hz). The uplink noise may be assumed to be negligible relative to the downlink noise, which may be achieved through proper satellite link parameters including the size of the transmit antenna.

Soft-In Soft-Out Iterative Divide-And-Conquer Receiver

Figure 4:
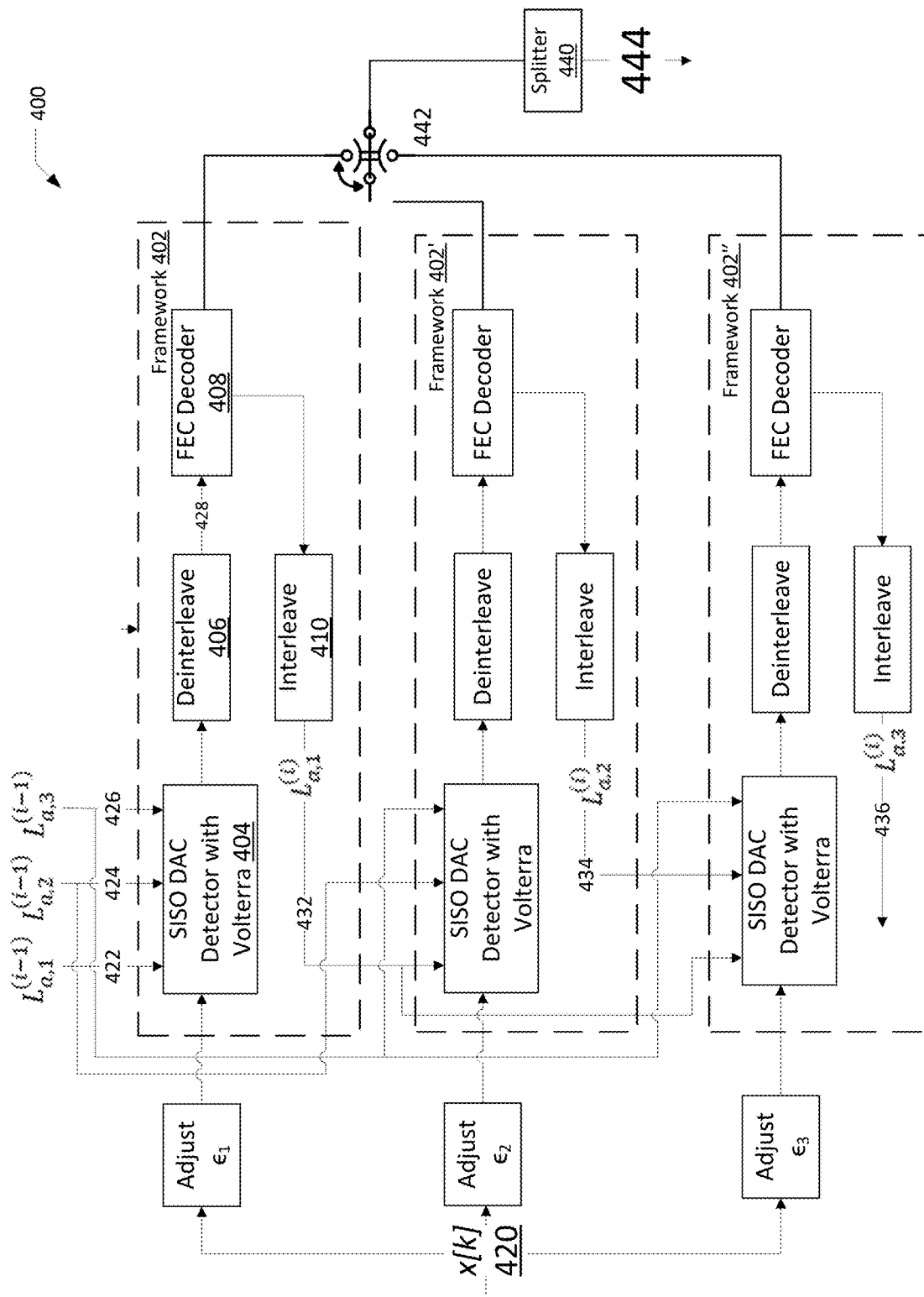
FIG. 4 illustrates a block diagram of a Soft-In-Soft-Out (SISO) Iterative Divide-And-Conquer (IDAC) receiver according to various embodiments.

FIG. 4 illustrates a block diagram of a Soft-In-Soft-Out (SISO) Iterative Divide-And-Conquer (IDAC) receiver according to various embodiments.

A Soft-In-Soft-Out (SISO) Iterative Divide-And-Conquer (IDAC) receiver 400 utilizes an efficient soft-in soft-out (SISO), successive interference cancellation (SIC) structure wherein joint detection and forward error correcting (FEC) decoding are applied in an iterative manner to recover the information bits intended for a user terminal. The SIC structure is known to maximize the achievable sum rate. The SISO IDAC receiver 400 implements a plurality of SISO frameworks 402, 402' and 402". The count of SISO frameworks 402, 402' and 402" may vary. For brevity, the SISO framework 402 is further elaborated below. However, each of the SISO frameworks 402', 402" function in a manner similar to the SISO framework 402.

The SISO framework 402 performs joint detection with a SISO DAC detector with Volterra 404 along with decoding with a FEC decoder 408 (after deinterleaving with a deinterleaver 406). An outer or global iteration begins by processing a composite signal 420 including a desired signal and an interfering signal. The outer or global iteration processes the interfering signal by employing the most robust signal in the joint CCI SISO DAC detector 404, while assuming equally likely a priori information 422, 424, 426 for the interferer signal, the desired signal and any additional interfering signal being processed jointly. Robustness describes a signal that has higher power and/or one that is more heavily FEC-coded. An output of the FEC Decoder is 408 is interleaved with interleaver 410 to provide the ith APPs 432, 434, 436 for SISO frameworks 402, 402', 402" respectively. The IDAC, detailed above, provides soft-information about CCI in the form of the symbol A Posteriori Probabilities (APPs) 432, 434, 436. The APPs 432, 434, 436 invoke Volterra-series expansion for accurately modeling the impact of the nonlinear CCI distortion. The APPs 432, 434, 436 are transformed to bit Log-Likelihood Ratios (LLRs) that are then converted to extrinsic information about the symbols using, for example, the bit-to-symbol mapping rule employed at the transmitter.

These bit LLRs are in turn deinterleaved by the deinterleaver 406 and input to the FEC decoder 408 as a decoding input 428. The FEC decoder 408 subsequently generates LLR soft estimates of the interfering signal's information bits. These are converted to extrinsic information by subtracting the LLRs at the input to the FEC decoder 408. The receiver 400 immediately uses this extrinsic information as the APPs 432, 434, 436 for processing the composite signal 420 employing the next most robust signal, thereby incorporating the latest information from the previous signal's FEC decoder, during the same outer iteration, leading to faster convergence.

At the completion of an outer iteration, the receiver has the APPs 432, 434, 436 estimates for all the signals being jointly processed and can use them during the next outer iteration as a priori information 422, 424, 426. As such the APP of a first iteration is the a priori information for the next iteration. Each framework may use the APP in succession or in parallel. For example, the receiver 400 uses the APP generated by the SISO framework 402 in succession for the SISO framework 402', and the APP generated by the SISO framework 402' is used in succession for the SISO framework 402". In a parallel implementation (not shown) of the receiver, the APP of an iteration is not used by the plurality of frameworks within the iteration.

The above framework can be applied to systems employing either Simultaneous Decoding (SD) or Simultaneous Non-unique Decoding (SND) methods. In SD, after a certain maximum number of global iterations, the hard decisions provided by two or more decoders is multiplexed by multiplexor 442 to form an estimate of the desired symbols 444 that may be converted to the user's information bits, for example, in a splitter 440. In SND, after a certain maximum number of global iterations, the hard decisions provided by only a single FEC decoder provides an estimate of the desired symbols 444 that may be converted to the user's information bits, for example, in the splitter 440. In SND, the multiplexor 442 may be eliminated.

SISO Divide-And-Conquer Detector

The optimal decision-theoretic SISO detector (for example, SISO DAC detector 404) provides the symbol APPs using the Bayesian rule and handles memory effects with a complexity that is exponential with the number of interferers and the memory span of each CCI source. Due to its exponential complexity, the optimal detector is severely unaffordable. This motivates the present low-complexity receiver including a SISO DAC paradigm of CCI detection and decomposing the interfering symbols into smaller sets depending on their intensity. A noise-floor (NF) set is created from the weak interfering sources which are not decoded but considered as thermal noise. The interfering symbols which are decoded are further split into a subtractive-cancellation (SC) set that subtracts the strong ones and another set that addresses the intense interferers in an optimal-Bayesian (OB) fashion. Specifically, the elements of the NF set are incorporated in the SISO DAC detector through their powers; elements of the SC set are incorporated via higher-order moments, computed from a priori probabilities; while the OB set uses the a priori pmf of the interfering symbols from within the OB set only.

To ensure suitability for user terminals, the computational complexity of detection algorithms is lowered by focusing on an instantaneous version at the current time sample. This raises a complexity that depends linearly on the memory span of the interference. For the DAC paradigm, the received signal at the matched-filter output, x[k], is equivalently given as Eq. (4).

$$x[k] = |\gamma_{n_d}| \cdot \sum_{l=0}^{N_{NL}} \lambda_{n_d,l} \cdot \left(a_{n_d,k} \cdot |a_{n_d,k}|^{l-1}\right) + \quad (4)$$

$$\underline{h}_{I,n_d}^{(OB)}[k] \cdot \underline{a}_{I,n_d}^{(OB)}[k] + \underline{h}_{I,n_d}^{(SC)}[k] \cdot \underline{a}_{I,n_d}^{(SC)}[k] + \underline{h}_{I,n_d}^{(NF)}[k] \cdot \underline{a}_{I,n_d}^{(NF)}[k] + w[k],$$

where the elements of $a_{I,n_d}[k; L]$ are split into three sets, $\underline{a}_{I,n_d}^{(NF)}[k]$, $\underline{a}_{I,n_d}^{(SC)}[k]$, $\underline{a}_{I,n_d}^{(OB)}[k]$, the row vectors $\underline{h}_{I,n_d}^{(NF)}[k]$, $\underline{h}_{I,n_d}^{(SC)}[k]$, $\underline{h}_{I,n_d}^{(OB)}[k]$ are their corresponding spatial and temporal channel coefficients extracted from the (L+1) th-row of the CCI channel matrix $H_{I,n_d}[k; L]$. In Eq. (4), the set $\{\lambda_{n,m}\}$ contains complex-valued coefficients to account for the amplitude/phase distortions induced by the nonlinear operation of the nth HPA that can be accurately derived from Volterra series kernels, and NNL is the nonlinearity order to be accounted for by the receiver.

Based on Eq. (4), the SISO DAC detector provides APP, $P_{DAC}(a_{n_d,k}|x[k])$, that is mathematically expressed as $$P_{DAC}(a_{n_d,k} \mid [k]) \propto \quad (5)$$

$$\sum_{\underline{a}_{I,n_d}^{(OB)}[k]} p_{DAC}\left(x[k] \mid a_{n_d,k}, \underline{a}_{I,n_d}^{(OB)}[k]\right) \cdot P\left(\underline{a}_{I,n_d}^{(OB)}[k] \mid L_a\right) \cdot P(a_{n_d,k} \mid L_a),$$

where $p_{DAC}(\cdot)$ is the likelihood function associated with $x[k]$, conditioned on the desired and interfering symbols from the OB set. The $p_{DAC}(\cdot)$ assumes that $x[k]$ is a random variable which retains a Gaussian probability density function (pdf) is given by $$p_{DAC}\left(x[k] \mid a_{n_d,k}, \underline{a}_{I,n_d}^{(OB)}[k]\right) \propto \exp\left\{-\frac{\left|\left(x[k] - \hat{I}_{n_d}^{(SC)}[k]\right) - |\gamma_{n_d}| \cdot \sum_{l=0}^{N_{NL}} \lambda_{n_d,l} \cdot \left(a_{n_d,k} \cdot |a_{n_d,k}|^{l-1}\right) - \underline{h}_{I,n_d}^{(OB)}[k] \cdot \underline{a}_{I,n_d}^{(OB)}[k]\right|^2}{\left(\sigma_u^2 + c_{I,n_d}^{(SC)}[k] + c_{I,n_d}^{(NF)}[k]\right)}\right\} \quad (6)$$

where the nonlinear terms in the OB group are taken into account as follows:

$$\underline{a}_{I,n_d}^{(OB)}[k] = \begin{bmatrix} \sum_{l=0}^{N_{NL}} \lambda_{1,l} \cdot \left(a_{I,1,k}^{(OB)} \cdot |a_{I,1,k}^{(OB)}|^{l-1}\right) \\ \sum_{l=0}^{N_{NL}} \lambda_{2,l} \cdot \left(a_{I,2,k}^{(OB)} \cdot |a_{I,2,k}^{(OB)}|^{l-1}\right) \\ \vdots \\ \sum_{l=0}^{N_{NL}} \lambda_{N_{OB},l} \cdot \left(a_{I,N_{OB},k}^{(OB)} \cdot |a_{I,N_{OB},k}^{(OB)}|^{l-1}\right) \end{bmatrix} \quad (7)$$

In Eq. (6), the soft estimate of interference from the co-channel beams arising from the SC set, $\hat{I}_{n_d}^{(SC)}[k]$, is subtracted after computing it as $$\hat{I}_{n_d}^{(SC)}[k] = \underline{h}_{I,n_d}^{(SC)}[k] \cdot E\{\underline{a}_{I,n_d}^{(SC)}[k] | L_a\} \quad (8),$$

whereas the variance contribution, $c_{I,n_d}^{(SC)}[k]$, is expressed as:

$$c_{I,n_d}^{(SC)}[k] = \underline{h}_{I,n_d}^{(SC)}[k] \cdot \text{Cov}\{\underline{a}_{I,n_d}^{(SC)}[k] | L_a\} \cdot (\underline{h}_{I,n_d}^{(SC)}[k])^H. \quad (9)$$

In Eqs. (8)-(9), the vector of interfering symbols in the SC set, $\underline{a}_{I,n_d}^{(SC)}[k]$, accounts for the nonlinear distortion as $$\underline{a}_{I,n_d}^{(SC)}[k] = \begin{bmatrix} \sum_{l=0}^{N_{NL}} \lambda_{1,l} \cdot \left(a_{I,1,k}^{(SC)} \cdot |a_{I,1,k}^{(SC)}|^{l-1}\right) \\ \sum_{l=0}^{N_{NL}} \lambda_{2,l} \cdot \left(a_{I,2,k}^{(SC)} \cdot |a_{I,2,k}^{(SC)}|^{l-1}\right) \\ \vdots \\ \sum_{l=0}^{N_{NL}} \lambda_{N_{SC},l} \cdot \left(a_{I,N_{SC},k}^{(SC)} \cdot |a_{I,N_{SC},k}^{(SC)}|^{l-1}\right) \end{bmatrix}. \quad (10)$$

In addition, the expressions $E\{\underline{a}_{I,n_d}^{(SC)}[k]|L_a\}$ Cov $\{\underline{a}_{I,n_d}^{(SC)}[k]|L_a\}$ in Eqs. (8)-(9) are obtained from the following component-wise higher-order moment relation using the symbol probabilities from the individual FEC decoders:

$$E\{a_{n,k}|a_{n,k}|^{l-1} \mid L_a\} = \sum_{j=1}^{M_n} a_j |a_j|^{l-1} \cdot P(a_{n,l} = a_j \mid L_a). \quad (11)$$

The $c_{I,n_d}^{(SC)}[k]$ in Eq. (9) can be implemented via a single summation as the matrix $\text{Cov}\{\underline{a}_{I,n_d}^{(SC)}[k]|L_a\}$ is diagonal due to the independence assumption justified by the interleaving. Finally, the variance contribution from the NF set, $c_{I,n_d}^{(NF)}[k]$ in Eq. (6), is computed based on the channel coefficients, without requiring decoding, as:

$$c_{I,n_d}^{(NF)}[k] = \underline{h}_{I,n_d}^{(NF)}[k] \cdot (\underline{h}_{I,n_d}^{(NF)}[k])^H. \quad (12)$$

The computational complexity of the SISO DAC detector is exponential in the number of interfering terms in the OB set only, needed to implement the summation in Eq. (5). However, the complexity is a linear function of the interfering symbols in the SC set. This is evident in the vector-multiplication operation for generating $\hat{I}_{n_d}^{(SC)}[k]$ in Eq. (8), which is then subtracted in Eq. (6), with a modification of the denominator expression by $c_{I,n_d}^{(SC)}[k]$ to incorporate second-order moments of the SC set. The cardinality of the OB set is designer-determined to manage complexity and is selected to be substantially smaller than is needed by the optimal method.

The APPs 422, 424, 426 evaluated by the SISO DAC detector, expressed in Eqs. (5)-(12), are iteratively exchanged with soft-output FEC decoders 408 utilizing the SIC structure, outlined in FIG. 4, where the co-channel signals are detected and decoded serially, adopting the order from most robust to least robust signal.

One example of the SISO DAC is designed to jointly process two dominant co-channel signals as follows. The nonlinear contributions of only the present symbol of the temporal profile of the dominant CCI is incorporated in the OB set, while its other nonlinear memory symbols are included in the SC set. The weaker CCIs are included in the NF set. Hence, the increase in complexity over the memoryless receiver is linear with respect to the nonlinear CCI memory span.

Another example of the SISO DAC detector is designed to jointly process three dominant cochannel signals as follows. The more robust interferer is included in its entirety in the SC set. For the other interferer, the nonlinear contributions of only the present CCI symbol of the temporal profile is included in the OB set, while its other temporal nonlinear symbols are included in the SC set. The weaker CCIs are included in the NF set. Hence, the increase in complexity over the memoryless receiver is linear with respect to the nonlinear CCI memory span, and linear relative to the additional signal.

As is typical in multiuser detection, the estimation of channel parameters $\underline{h}_{I,n_d}^{(NF)}[k]$, $\underline{h}_{I,n_d}^{(SC)}[k]$, $\underline{h}_{I,n_d}^{(OB)}[k]$ in Eq. (4) is required for each beam that induces strong interference. This can be implemented using orthogonal pilots, such as Walsh-Hadamard sequences, with one pilot sequence per dominant beam. Fortunately, multibeam satellites systems on the forward link do not suffer from pilot contamination. Specifically, due to their high directivity, the number of adjacent beams that are jointly detected is expected to be small, lower than the number of orthogonal sequences already anticipated by DVB-S2X. Also, the orthogonality of these sequences at the user terminal is not adversely affected by the satellite channel as it experiences negligible multipath fading. In contrast to precoding, user terminal-based mitigation solutions have the advantage of not requiring that channel estimates be periodically reported to the gateways.

Numerical Studies

Results from extensive performance evaluations demonstrate the effectiveness of the IDAC receiver. The simulation setup implements the system model from Section I and employs MODCODs defined in the DVB-S2X standard including Low-Density Parity Check (LDPC) coding with a codeblock size of 64,800 bits. The transmit pulse and its corresponding receive matched filtering use RRC shaping with rolloff of 0.05. It is assumed that the satellite transponders are operated efficiently close to saturation, inducing strong nonlinear distortion at the user terminals.

Figure 5:
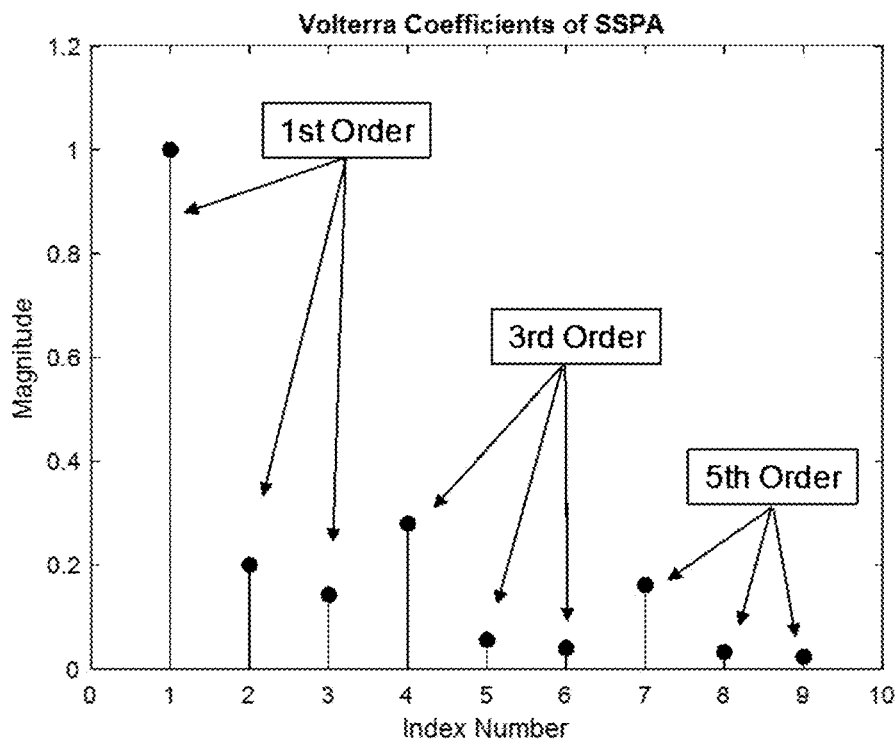
FIG. 5 illustrates a temporal nonlinear CCI profile used for evaluation in one embodiment.

FIG. 5 illustrates a temporal nonlinear CCI profile used for evaluation in one embodiment.

FIG. 5 illustrates Volterra coefficients of SSPA containing 1st-order, 3rd-order, and 5th-order nonlinear terms with a memory span of two symbols.

A spatial profile of CCI for the performance assessment when aggressive frequency reuse such as reuse 2 is adopted. An exemplary CCI spatial profile for two-color frequency reuse plan is listed in the table below. The table lists typical CCIs of two-color frequency reuse using realistic antenna radiation patterns. The CCI profile, denoted as CIR-1 in the table, is representative of a user terminal located at the edge of two co-channel beams and contains one dominant source of CCI, of equal strength to the desired signal, and four weaker co-channel interferers, labeled as interferer 2 through 5. Further, the desired signal and CCI completely share the same frequency spectrum. TABLE I below illustrates

| Interferer | 1 | 2 | 3 | 4 | 5 |
|---|---|---|---|---|---|
| CIR-1 | 0 dB | 25 dB | 25 dB | 27 dB | 30 dB |
| Constellation | QPSK | 8PSK | 8PSK | 16APSK | 8PSK |

The SISO DAC detectors for the CCI profile of the Table were designed to jointly process two dominant co-channel signals. Only the present CCI symbol with its nonlinear contributions was included in the OB set containing, corresponding to indexes 1, 4, and 7 in FIG. 5. The other temporal interfering nonlinear symbols of FIG. 5 were included in the SC set. Lastly, the four weaker CCIs were included in the NF set. Hence, the increase in complexity over the memoryless receiver was linear with respect to the nonlinear CCI memory span.

The soft outputs of the DAC detectors 404 were iteratively exchanged with the soft outputs of individual FEC decoders 408, utilizing the SIC structure of FIG. 4. In one embodiment, a maximum of ten outer iterations may be implemented.

For the SND method, a 16APSK was transmitted on the primary signal with a 28/45-rate code while the dominant interferer employed a 1/4-rate code.

Figure 6A:
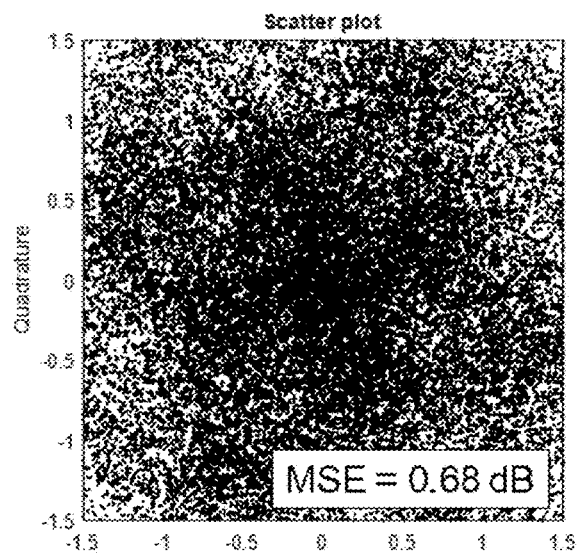
FIG. 6A illustrates an exemplary noiseless scatter plot at the decoder input for a 16APSK-modulated main signal from a nearly saturated transponder received without CCI mitigation in 2-reuse scheme.

FIG. 6A illustrates an exemplary noiseless scatter plot at the decoder input for a 16APSK-modulated main signal from a nearly saturated transponder received without CCI mitigation in 2-reuse scheme.

Figure 6B:
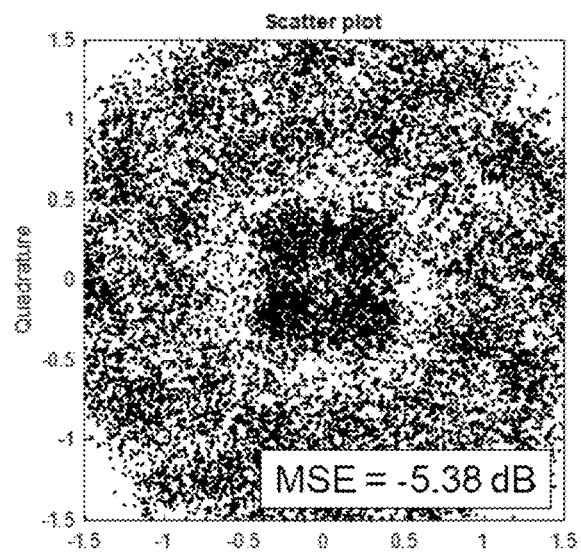
FIG. 6B illustrates an exemplary noiseless scatter plot at the decoder input for a 16APSK-modulated main signal from a nearly saturated transponder received after a linear (1st order) CCI mitigation.

FIG. 6B illustrates an exemplary noiseless scatter plot at the decoder input for a 16APSK-modulated main signal from a nearly saturated transponder received after a linear (1st order) CCI mitigation.

Figure 6C:
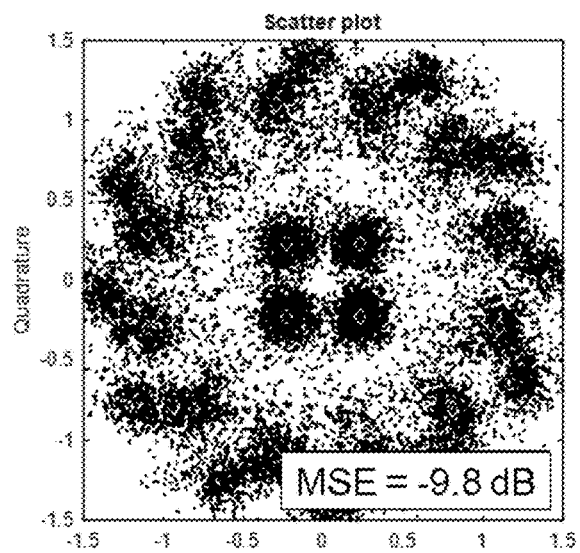
FIG. 6C illustrates an exemplary noiseless scatter plot at the decoder input for a 16APSK-modulated main signal from a nearly saturated transponder received after a cubic (3rd order) CCI mitigation.

FIG. 6C illustrates an exemplary noiseless scatter plot at the decoder input for a 16APSK-modulated main signal from a nearly saturated transponder received after a cubic (3rd order) CCI mitigation.

Figure 6D:
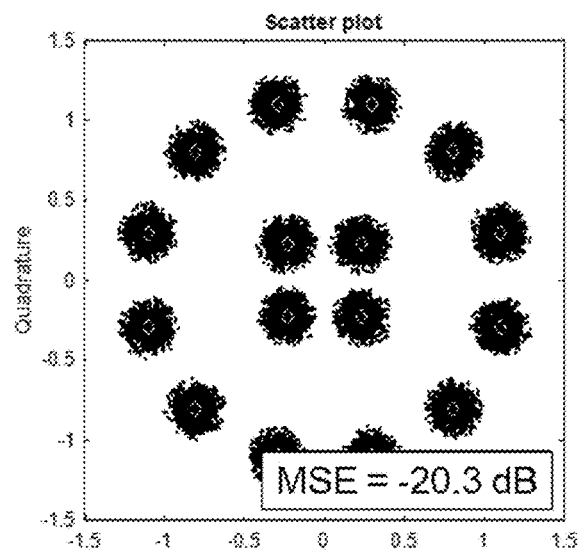
FIG. 6D illustrates an exemplary noiseless scatter plot at the decoder input for a 16APSK-modulated main signal from a nearly saturated transponder received after a CCI mitigation with the present teachings.

FIG. 6D illustrates an exemplary noiseless scatter plot at the decoder input for a 16APSK-modulated main signal from a nearly saturated transponder received after a CCI mitigation with the present teachings.

As is evident from FIG. 6A, a nearly saturated transponder without CCI mitigation is resolved with a Mean Squared Error (MSE) of 0.68 decibels (dB). In FIG. 6A, the level of CCI-induced distortion is substantial, precluding the use of spectrally efficient APSK modulations for the user terminal without CCI mitigation. FIG. 6B illustrates that only linear (or 1storder) CCI mitigation offers little improvement in MSE to about −5.38 dB. FIG. 6C illustrates that cubic CCI mitigation improves the MSE to about −9.8 dB; this is generally below the level of a signal lock. In contrast, as shown in FIG. 6D, a IDAC receiver of the present teachings very successfully mitigates the CCI and offers significant reduction in the clustering, improving the MSE by about 20 dB for the primary signal. The improvement in MSE was commensurate with the residual noise floor at the receiver caused by the weaker CCI signals. The implication is that the IDAC receiver can completely mitigate interference from the dominant co-frequency beam, even in the presence of strong CCI with nonlinear components.

Figure 7:
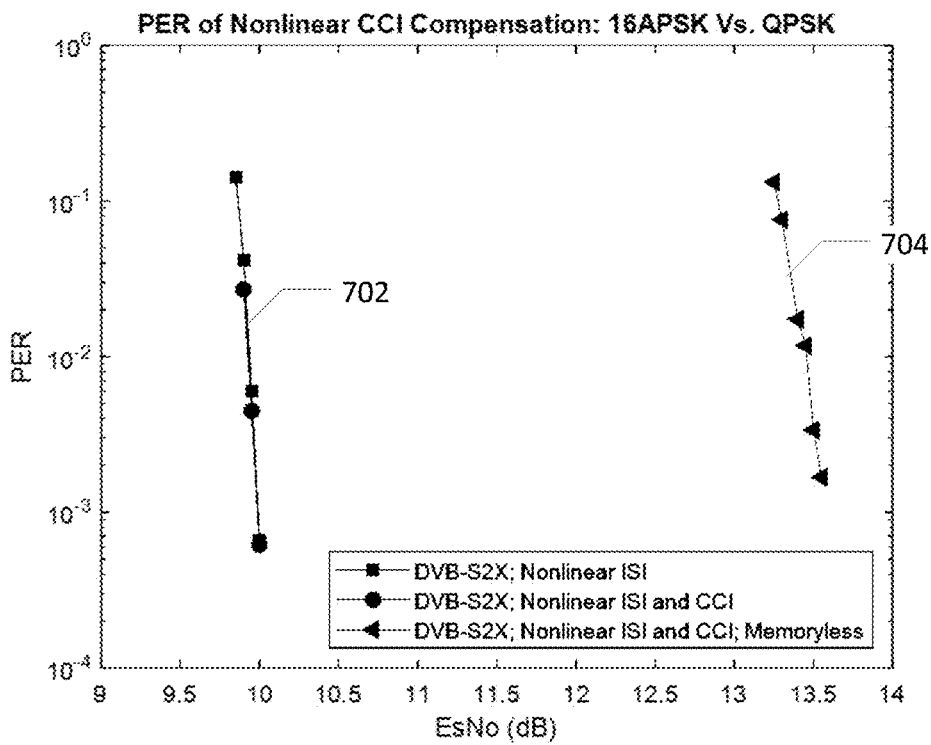
FIG. 7 illustrates PER versus EsN0 performance for the 16APSK signal.

FIG. 7 illustrates PER versus EsN0 performance for the 16APSK signal.

In FIG. 7, a receiver of the present suffers from no performance degradation and approaches single user (no-CCI) performance per line plot 702. FIG. 7 highlights the significance of compensating for the memory effects of nonlinear CCI. For example, performance with the memoryless solution degrades by about 3.5 dB per line plot 704. The increase in complexity of the present receivers is linear with respect to memory. This is noteworthy in light of the significant CCI memory span and APSK modulation cardinality. The performance offered by the present advanced receivers allows user terminals located at the edges of co-frequency beams to benefit from high spectral efficiencies offered by APSK MODCODs as well as high power efficiency afforded by operating satellite transponders close to saturation.

Having described preferred embodiments of a system and method (which are intended to be illustrative and not limiting), it is noted that modifications and variations can be made by persons skilled in the art considering the above teachings. It is therefore to be understood that changes may be made in the embodiments disclosed which are within the scope of the invention as outlined by the appended claims.

Having thus described aspects of the invention, with the details and particularity required by the patent laws, what is claimed and desired protected by Letters Patent is set forth in the appended claims.

I claim as my invention:

1. A communications apparatus comprising:
   a composite signal comprising an induced nonlinear distortion, a desired signal and interferer signals, wherein the desired signal comprises desired symbols and the interferer signals comprise interferer symbols; and
   N frameworks, each framework comprising a detector to partition the desired symbols and the interferer symbols based on an interference severity into a dominant group and a non-dominant group, and to generate A Posteriori Probabilities (APP) of the desired symbols and the interferer symbols,
   wherein the detector of each of the N frameworks generates the APP based on a feedback of the APP from each of the N frameworks, and
   the detector reduces the induced nonlinear distortion of the desired signal using a nonlinear mathematical model, wherein the nonlinear mathematical model comprises a Volterra series represented as $$s_{NL,n}(t) = \sum_l \tilde{\lambda}_{n,l} \cdot \left(s_n(t) \cdot |s_n(t)|^{l-1}\right),$$

where $\tilde{\lambda}_{n,l}$ are complex-valued coefficients to account for the induced nonlinear distortion of a respective High-Power Amplifier (HPA) of N HPAs and $s_n(t)$ is a baseband representation of the desired signal after pulse shaping.

2. The communications apparatus of claim 1, wherein the detector of each of the N frameworks transforms the APP to a first Log-Likelihood Ratios (LLRs) using a bit-to-symbol mapping rule, and
   each of the N frameworks further comprises
      a deinterleaver to deinterleave the first LLRs into a decoder input,
      a Forward Error Correcting (FEC) Decoder to decode the decoder input and to generate a second LLRs from a decoded decoder input, and
      an interleaver to interleave the second LLRs,
   wherein the second LLRs are fed back as the APP for a respective N framework after the interleaver of the respective N framework, and
   the second LLRs of each of the N frameworks represent either the desired symbols or the interferer symbols.

3. The communications apparatus of claim 2, wherein the desired signal is more robust than each of the interferer signals, and the second LLRs from the FEC decoder of a first framework of the N frameworks represent the desired symbols.

4. The communications apparatus of claim 2, wherein at least one of the interferer signals is more robust than the desired signal, and the second LLRs from the FEC decoder of a framework other than a first framework of the N frameworks represent the desired symbols.

5. The communications apparatus of claim 4, wherein the desired symbols are recovered by Simultaneous Decoding (SD) or by Simultaneous Non-unique Decoding (SND).

6. The communications apparatus of claim 1, wherein the induced nonlinear distortion is generated by a High-Power Amplifier (HPA) operating close to its saturation.

7. The communications apparatus of claim 1, wherein the communications apparatus is disposed in a SISO Iterative Divide and Conquer (IDAC) receiver and the detector is a SISO DAC detector.

8. The communications apparatus of claim 1, wherein the dominant group comprises an Optimal-Bayesian (OB) group via a probability mass function (pmf).

9. The communications apparatus of claim 1, wherein the non-dominant group comprises a Noise-Floor (NF) group incorporated via a power of each member and a Subtractive-Cancellation (SC) group incorporated via first- and second-order moments derived from the APP, and the dominant group comprises an Optimal-Bayesian (OB) group incorporated via a probability mass function (pmf).

10. The communications apparatus of claim 1, wherein a count of the N frameworks is selected from one (1), two (2) or three (3).

11. The communications apparatus of claim 1, wherein the desired signal and the interferer signals comprise DVB-S2X standard compliant signals.

12. The communications apparatus of claim 1, wherein a computational complexity of the detector is lowered by focusing on an instantaneous version of a current time sample.

13. A computer implemented method comprising:
   providing a composite signal comprising an induced nonlinear distortion, a desired signal and interferer signals, wherein the desired signal comprises desired symbols and the interferer signals comprise interferer symbols; and
   iteratively computing, N frameworks, each of the N frameworks comprising
      partitioning, with a detector, the desired symbols and the interferer symbols based on an interference severity into a dominant group and a non-dominant group, and
      generating A Posteriori Probabilities (APP) of the desired symbols and the interferer symbols,
   wherein the detector of each of the N frameworks generates the APP based on a feedback of the APP from each of the N frameworks,
   the detector reduces the induced nonlinear distortion of the desired signal using a nonlinear mathematical model, and
   the nonlinear mathematical model comprises a Volterra series represented as $$s_{NL,n}(t) = \sum_l \tilde{\lambda}_{n,l} \cdot \left(s_n(t) \cdot |s_n(t)|^{l-1}\right),$$

where $\tilde{\lambda}_{n,l}$ are complex-valued coefficients to account for the induced nonlinear distortion of a respective High-Power Amplifier (HPA) of N HPAs and $s_n(t)$ is a baseband representation of the desired signal after pulse shaping.

14. The method of claim 13, wherein the detector of each of the N frameworks transforms the APP to a first Log-Likelihood Ratios (LLRs) using a bit-to-symbol mapping rule, and
   the iteratively computing further comprises:
      deinterleaving the first LLRs into a decoder input,
      decoding the decoder input,
      generating a second LLRs from a decoded decoder input and
      interleaving the second LLRs, wherein the second LLRs are fed back as the APP for a respective N framework after the interleaver of the respective N framework, and the second LLRs of each of the N frameworks represent either the desired symbols or the interferer symbols.

15. The method of claim 14, wherein the desired signal is more robust than each of the interferer signals, and the second LLRs from the decoding of a first framework of the N frameworks represent the desired symbols.

16. The method of claim 14, wherein at least one of the interferer signals is more robust than the desired signal, and the second LLRs from the decoding of a framework other than a first framework of the N frameworks represent the desired symbols.

17. The method of claim 13, wherein the non-dominant group comprises a Noise-Floor (NF) group incorporated via a power of each member and a Subtractive-Cancellation (SC) group incorporated via first- and second-order moments derived from the APP, and the dominant group comprises an Optimal-Bayesian (OB) group incorporated via a probability mass function (pmf).

18. The method of claim 17, wherein the induced non-linear distortion is generated by a High-Power Amplifier (HPA) operating close to its saturation.

* * * * *